United States Patent [19]

Yamamiya et al.

[11] Patent Number: 4,750,163
[45] Date of Patent: Jun. 7, 1988

[54] PICK-UP HEAD ABNORMALITY DETECTOR FOR OPTICAL RECORDING/REPRODUCING APPARATUS

[75] Inventors: Kunio Yamamiya, Sagamihara; Masaharu Sakamoto, Tokyo, both of Japan

[73] Assignee: Olympus Optical Co., Ltd., Tokyo, Japan

[21] Appl. No.: 836,673

[22] Filed: Mar. 5, 1986

[30] Foreign Application Priority Data

Mar. 14, 1985 [JP] Japan ................................. 60-51163

[51] Int. Cl.$^4$ ...................... G11B 7/085; G11B 27/36
[52] U.S. Cl. ...................................... 369/54; 369/122; 369/44; 369/46
[58] Field of Search ................... 369/54, 58, 275, 277, 369/278, 279, 122, 30, 32, 44, 46, 106, 116; 250/201, 202

[56] References Cited

U.S. PATENT DOCUMENTS

| | | | |
|---|---|---|---|
| 4,005,259 | 1/1977 | Kaneko | 369/122 |
| 4,051,329 | 9/1977 | Blondet | 369/116 |
| 4,094,010 | 6/1978 | Pepperl | 365/215 |
| 4,145,758 | 3/1979 | Drexler | 369/54 |
| 4,363,116 | 12/1982 | Kleuters | 369/54 |
| 4,375,091 | 2/1983 | Dakins | 369/32 |
| 4,611,317 | 9/1986 | Takeuchi | 369/54 |
| 4,627,725 | 12/1986 | Nishio | 369/46 |
| 4,642,803 | 2/1987 | Drexler | 369/58 |

FOREIGN PATENT DOCUMENTS

| | | |
|---|---|---|
| 2611734 | 10/1976 | Fed. Rep. of Germany . |
| 3346114 | 7/1984 | Fed. Rep. of Germany . |
| 3409557 | 9/1984 | Fed. Rep. of Germany . |
| 2137799A | 10/1984 | United Kingdom . |

*Primary Examiner*—Alan Faber
*Attorney, Agent, or Firm*—Frishauf, Holtz, Goodman & Woodward

[57] ABSTRACT

A device for detecting the abnormality of an optical pick-up head has a laser diode for emitting a light beam through an optical system to a reference reflective region formed at a predetermined portion of an optical disk, a photosensor for receiving a reflected light from the reflective region through the optical system, and a photosensor for detecting directly the light amount of the laser diode. The difference or a ratio of the detection signals of the photosensors is obtained, and the difference or the ratio is compared with a predetermined value. When the compared result exceeds a predetermined value, the result is decided to be an abnormality of the pick-up head.

10 Claims, 4 Drawing Sheets

F I G. 2
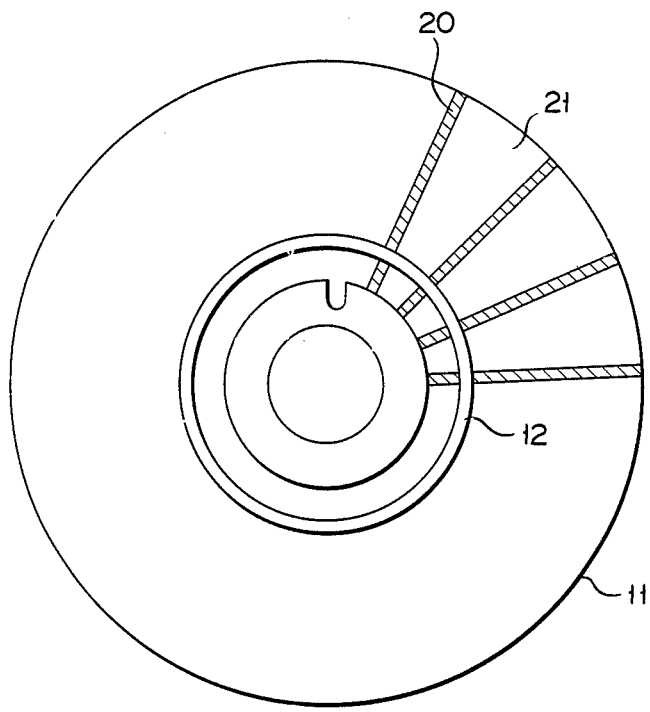

FIG. 3
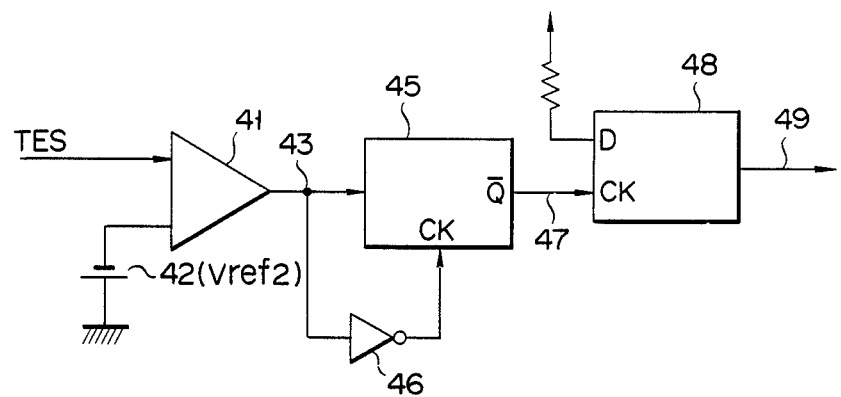
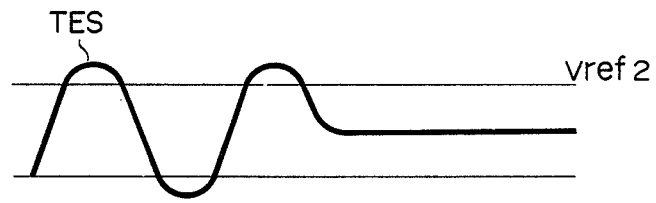
FIG. 4A
FIG. 4B
FIG. 4C
FIG. 4D FIG. 5
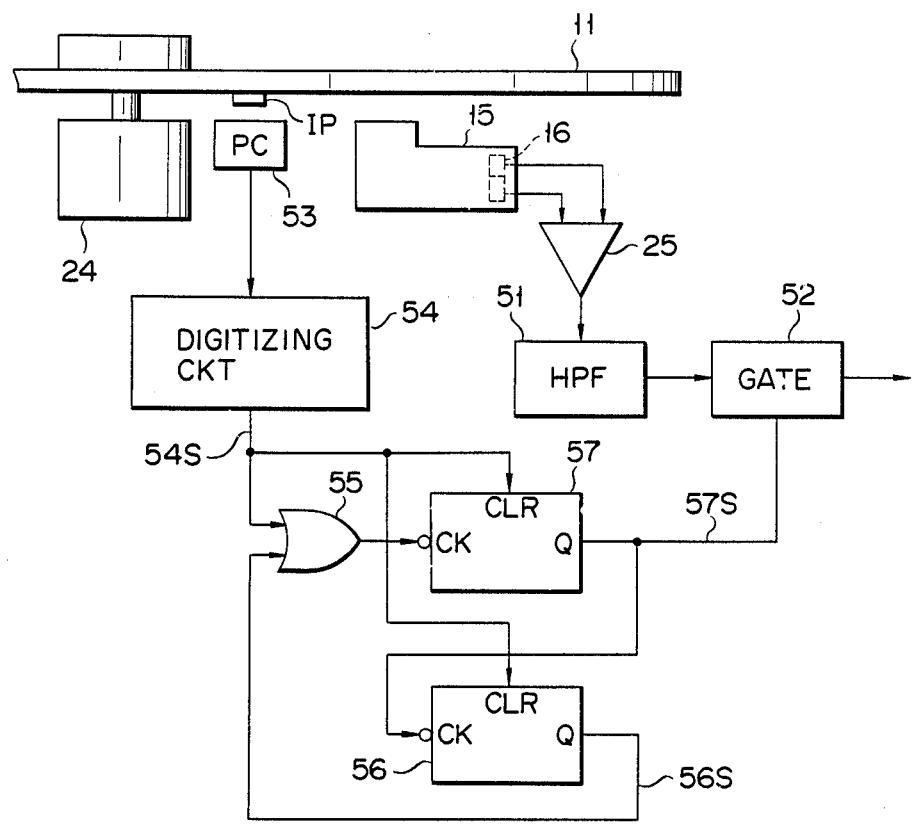
FIG. 6A 54S
FIG. 6B 57S
FIG. 6C 56S

PICK-UP HEAD ABNORMALITY DETECTOR FOR OPTICAL RECORDING/REPRODUCING APPARATUS

BACKGROUND OF THE INVENTION

The present invention relates to a device for detecting the abnormality of a pick-up head for an optical recording/reproducing apparatus.

In an apparatus for optically recording and reproducing information, information is recorded on a recording medium and erased by emitting a light beam from an optical pick-up head to the medium. The recorded information of the medium is reproduced by detecting the light beam reflected from the medium, and tracking and focus servo controls are performed. A predetermined optical system is used to emit the light beam to the medium and to detect the reflected light. The optical system is constructed by a lens and a prism. When dusts are adhered to the optical members, the amount of light beam emitted from the head decreases. Thus, information is not completely recorded in a recording mode, and a reproducing error is generated in a reproducing mode. Further, a serious defect occurs in the feedback loops of tracking and focusing servo mechanisms.

Since the object facing surface of the objective lens of the optical system of the optical pick-up head is exposed with a recording medium, dusts tend to feasibly adhere to the lens surface. A user does not note the dusts adhered to the lens. Therefore, means for detecting the abnormality of a pick-up head due to the dusts adhered to the optical system is desired.

SUMMARY OF THE INVENTION

An object of the present invention is to provide a pick-up head abnormality detecting device for detecting the abnormality of an optical pick-up head due to dusts adhered to the optical system of the head.

According to the present invention, a light beam is emitted from a light source of an optical pick-up head through an optical system to a reference reflective region provided at a predetermined portion of a recording medium, and the reflected light from the region is detected through the optical system by a first photosensor. The light amount of the light source is detected by a second photosensor. The abnormality of the head is detected by the difference or the value of the ratio of the detection signals of the first and second photosensors.

BRIEF DESCRIPTION OF THE DRAWINGS

FIG. 2 is a plan view of an optical disk;

FIG. 3 is a circuit diagram of a detector section;

FIGS. 4A to 4D are timing charts of signals presented in the circuit of FIG. 3;

FIG. 5 is a block diagram of a reproducing system of an optical disk apparatus; and FIGS. 6A to 6C are timing charts of signals presented in the circuit of FIG. 5.

DETAILED DESCRIPTION OF THE PREFERRED EMBODIMENTS

Figure 1:
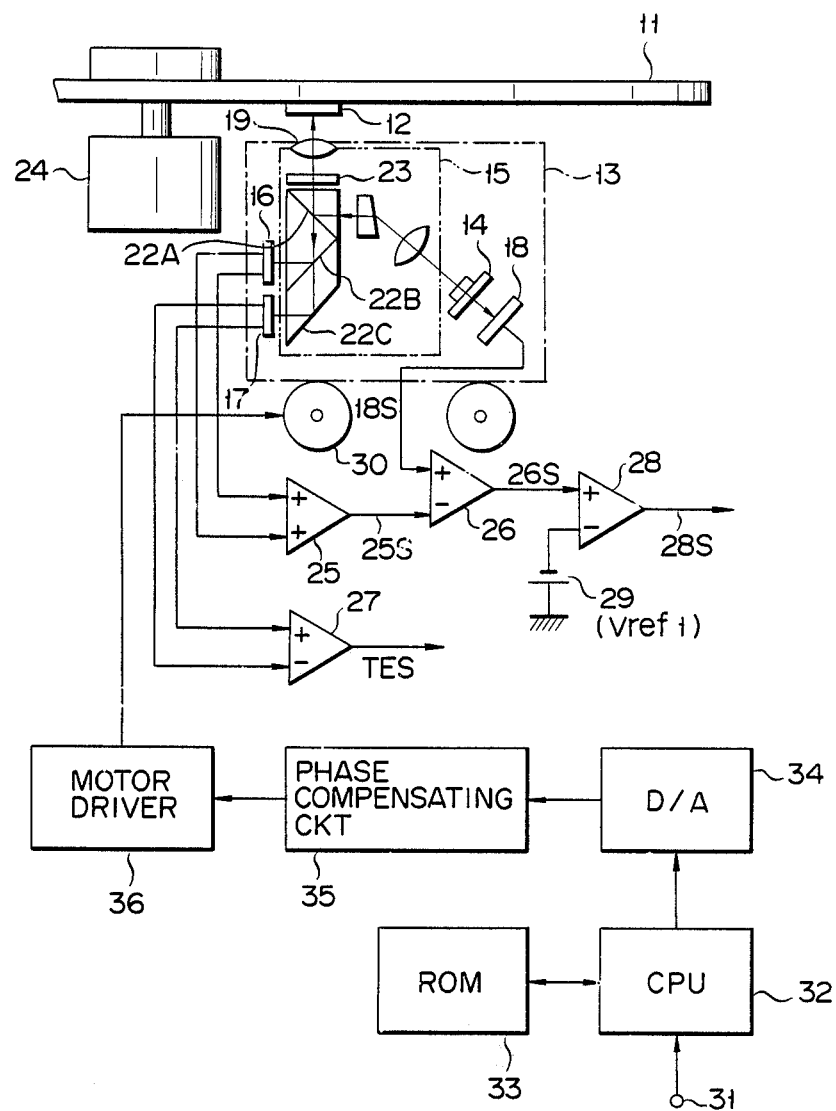
FIG. 1 is a view of the construction of an optical recording/reproducing apparatus having a pick-up head abnormality detecting device according to one embodiment of the present invention.

In FIG. 1, a reference reflective region 12 is formed on an optical disk 11 as a recording medium. The reflective region 12 is concentrically formed in the vicinity of the inner periphery of the disk 11 by depositing a metallic film. The reflective region 12 is preferably formed to have a width corresponding to several tracks to several ten tracks formed concentrically on the disk 11. The reflective region 12 is so composed as to have a full reflection surface in this embodiment, but is not necessarily in 100% reflection, and may be formed to have uniform reflectivity on the entire surface of the region 12. However, information cannot be recorded on the region 12.

Each track of the disk 11 is divided into a plurality of sectors, and each sector includes, as shown in FIG. 2, prepit portions 20 and pregroove portions 21. Various data such as addresses necessary for each sector are recorded on the prepit portions 20.

An optical pick-up head 13 comprises a laser diode 14 as a light source, an optical system 15, a photosensor 16 for detecting a DCSUM signal, a photosensor 17 for a tracking and focusing control and a photosensor 18 for detecting the light amount of the light source. The optical system 15 is constructed by an objective lens 19, a polarizing prism 22A, half prism 22B, mirror 22C and a ¼ wavelength plate 23. A motor 24 is a spindle motor for rotating the disk 11. A light beam emitted from the diode 14 is emitted through the optical system 15 to the disk 11. The reflected light from the disk 11 is again incident through the optical system 15 to the photosensors 16 and 17. The light beam emitted from the back side of the laser diode 14 is detected directly by the photosensor 18. The photosensors 16 and 17 each comprise two- or four-divided photodiodes.

The output signals of the photosensor 16 are added by an adder 25, and used as a full reflection light amount signal (DCSUM signal). The output signals of the photosensor 17 are supplied to a differential amplifier 27. The output signal of the amplifier 27 becomes a tracking error signal (TES), and is used as a feedback signal for a tracking control. In FIG. 1, a tracking servo circuit is not shown, but comprises an ordinary tracking servo circuit.

A photosensor 18 is a photodiode such as a PIN diode, and is provided to monitor the amount of output light of the diode 14. The output terminal of the photosensor 18 is connected together with the output terminal of the adder 15 to the amplifier 26. The output terminal of the amplifier 26 is connected to the non-inverting input terminal of a differential amplifier 28. A reference voltage (Vref1) source 29 is connected to the inverting input terminal of the amplifier 28.

The pick-up head 13 is coupled with a voice coil motor 30, and moved by the voice coil motor 30 in the radial direction of the disk 11. A terminal 31 for inputting a start signal is connected to a CPU 32. The CPU 32 is connected to a ROM 33, and to a D/A converter 34. Address data corresponding to the reflective region 12 provided on the disk 11 and a program for executing the abnormality detection operation are stored in the ROM 33. The output terminal of the converter 34 is connected through a phase compensating circuit 35 to a motor driver 36. The driver 36 drives the voice coil motor 30 to move the head 13 to the radial direction of the disk 11.

The operation of detecting the abnormality of the pick-up head will be described. An abnormality detecting start signal is first input to the terminal 31. When the CPU 32 receives the abnormality detecting start signal, the CPU 32 reads out address data corresponding to the reflective region 12 from the ROM 33. The address data is converted by the converter 34 into an analog address signal, and input through a phase compensating circuit 35 to the motor driver 36. The driver 36 drives the motor 30 in response to the address signal to move the head 13 to the reflective region 12.

When the head 13 moves in the radial direction of the disk 11, the light beam from the laser diode 14 is emitted through the optical system 15 to the disk 11. The light beam reflected from the disk 11 is incident through the objective lens 19, ¼ wavelength plate 23, polarizing prism 22A, half prism 22B and mirror 22C to the photosensors 16 and 17.

A tracking error signal produced by the output signals of the photosensor 17 from the differential amplifier 27 is input to a comparator 41 shown in FIG. 3. The comparator 41 compares a signal TES shown in FIG. 4A with a reference voltage Vref2, and outputs a pulse signal 43 shown in FIG. 4B. The signal 43 is input directly to a retriggable mono-multivibrator 45, and through an inverter 46 to the clock input of mono-multivibrator 45. The mono-multivibrator 45 outputs a pulse signal 47 shown in FIG. 4C in response to the falling edge of the signal 43.

When the head 13 arrives at the reflective region 12 and the output signal TES of the differential amplifier 27 does not vary, that is, when last pulse 43A of pulse signal 43 is outputted, the multivibrator 45 outputs a pulse signal 47 rising after a time T in response to the falling edge of the output pulse 43A of the comparator 41. A D-type flip-flop outputs a pulse signal 49 shown in FIG. 4D in response to the rising edge of the pulse signal 47. When the signal 49 is input to the CPU 32, the CPU 32 applies a stop signal to the driver 36 to stop the movement of the pick-up head 13. Thus, the pick-up head 13 stops at the position of the reflective region 12. The output signal 25S produced through the adder 25 from the photosensor 16 and the output signal 18S of the photosensor 18 are supplied to a differential amplifier 26. The amplifier 26 outputs a signal 26S representing the difference of both the signals 25S and 18S. A divider may be used instead of the amplifier 26 to obtain the ratio of both the signals. This difference signal 26S (or ratio signal) is input to a comparator 28 which compares the signal 26S with a reference voltage Vref1. When the signal 26S is larger than the reference voltage Vref1, the comparator 28 outputs a signal 28S representing the abnormality. In other words, when dusts are adhered to the objective lens of the optical system 15, the incident light amount to the sensor 16 decreases when the reflected light beam from the reflective region 12 is detected by the photosensor 16. Thus, the output signal 26S of the differential amplifier 26, i.e., a signal representing the difference or the ratio of the reflected light amount detected by the photosensor 16 and the emitting light amount detected by the photosensor 18 exceeds the reference value, which indicates the abnormality.

When the objective lens 19 is vibrated largely by an inertia by an elastic member for holding the objective lens 19 when the head 13 is stopped, a pulse which rises with a predetermined delay from the rising edge of a stop command signal 49 shown in FIG. 4d is formed, the delay time being equal to a period of time that the vibration of the lens 19 is presumed to be stopped. When the abnormality is detected by the rising edge of the pulse, the abnormality can be detected more accurately.

In the embodiment described above, the reason why the width of the reflective region 12 is increased to some degree is as below. When a time T is elapsed after the tracking error signal is extinguished due to the landing of the light beam to the reflective region 12, the head 13 is stopped. Thus, in order to emit the light beam to the reflective region 12 at the stopping time, the region 12 must have a width longer than the moving distance of the time T. Then, the region 12 has a width slightly longer than the distance that the head 13 moves for the time T by considering the margin. Therefore, the value of the drive data read out from the ROM 33 is determined by the width of the reflective region 12. More specifically, the moving speed of the head is controlled at the predetermined speed or lower so that, even if the head 13 moves for the time T from the detection of the reflective region 12, the head 13 remains within the width of the reflective region 12.

In the following explanation, an embodiment in which parts of prepits 20 and pregrooves 21 formed on the disk 11 are utilized as a reference reflective region in the embodiment of FIG. 1 will be described. In this case, the pregrooves 21 of the track having a special address stored in the ROM 33 is used as the reference reflective region.

The CPU 32 reads out the address of a reference track from the ROM 33 in response to a start signal. The CPU 32 further reads out the address, i.e., obtains a difference between a target address and the present address read out by the head 13, reads out the drive data corresponding to the difference from the ROM 33, and supplies the drive data through circuits 34 and 35 to a motor driver 36. The driver 36 drives the voice coil motor 30 in response to the drive data, moves the head 13 to the reference track, and positions the head 13 at the reference track.

When the reference track is detected, a tracking and focussing servo device (not shown) operates, and the abnormality is detected by the output signals of the photosensors 16 and 18 in the same manner as the previous embodiment.

The pregrooves in the reference track may be formed by an aluminum film having a reflectivity higher than the recording medium to raise the detecting sensitivity.

When the address is read out by the head 15, the output signals of the photosensor 16 are input, as shown in FIG. 5, through the adder 25 to a high pass filter (HPF) 51. The HPF 51 removes excessive low frequency components from the signal of the adder 25, and outputs only the address signal and the data signal component to a gate 52. The gate 52 operates to respond to the detecting signal of an index detector 53 so as to pass only the address signal.

An index detector 53 is provided on the innermost periphery of the disk 11, and provided to detect an index part IP formed of a member having a reflectivity different from other regions. The detector 53 includes a light emitting diode for emitting a light beam toward the disk 11, and a photocoupler for converting the light beam reflected from the disk 11 into an electric signal. The output terminal of the detector 53 is connected to a digitizing circuit 54 for converting the analog signal into a binary signal. The output terminal of the digitizing circuit 54 is connected to one input terminal of an OR gate 55, and to clear terminals CLR of one-shot multivibrators 56 and 57. The other input terminal of the OR gate 55 is connected to Q terminal of the multivibrator 56. The output terminal of the OR gate 55 is connected to the clock terminal CK of the multivibrator 57. The Q terminal of the multivibrator 57 is connected to the gate 52 and the clock terminal CK of the multivibrator 56.

In the circuit in FIG. 5, the index detector 53 supplies its output signal to the digitizing circuit 54 whenever it detects the index part IP. The signal is shaped to a pulse signal 54S shown in FIG. 6A, and input to the OR gate 55. When the output signal of the OR gate 55 is input to the clock terminal of the multivibrator 57, the multivibrator 57 outputs the pulse signal 57S (FIG. 6B) of a pulse width t1 from the Q terminal in response to the falling edge of the pulse signal 54S. The gate 52 operates in response to the signal 57S to pass only the address signal. When the output pulse 57S of the multivibrator 57 is input to the clock terminal of the multivibrator 56, the multivibrator 56 outputs a pulse signal 56S (FIG. 6C) of a pulse width t2 in response to the falling edge of the pulse signal 57S. When this pulse signal is input through the OR gate 55 to the clock terminal of the multivibrator 57, the multivibrator 57 again outputs a pulse of a pulse width t1 in response to the falling edge of the pulse signal 56S. In other words, the multivibrator 57 repeatedly outputs the pulse of pulse width t1 at a pulse interval t2. When the t1 and t2 are determined in correspondence with the lengths of the prepits and the pregrooves, the output pulse signal of the multivibrator 57 controls the OR gate to output only the address signal from the OR gate 52.

In the embodiment described above, it is preferable to displace the focus of the light beam from the reflection surface of the reflective region when the light beam is emitted to the reflective region. This is to eliminate an influence to the detection of the abnormality even if a defect is presented on the surface of the reflective region. In order to displace the focus in this manner, the optical system may be moved, for example, until a focus error signal corresponding to a point displaced from the focus point is obtained. If the circuit is so constructed that the output signal 28S of the comparator 28 and the output signal 48S of the flip-flop 48 are output through an AND gate, the abnormality due to dusts adhered to the lens may be detected only after the light beam arrives at the reflective region, the pick-up head detects the reflected light, and the head is stopped by the detection signal.

What is claimed is:

1. A device for detecting an abnormality of an optical pick-up head opposed to a recording medium and relatively movable with respect to the recording medium, comprising:
   light source means for outputting a light beam;
   a reference reflective region forming a part of the recording medium,
   an optical system for leading the light beam to selected parts of said recording medium including said reference reflective region,
   means for transferring said optical pick-up head to said reference reflective region on the recording medium,
   first light amount detecting means for detecting a light amount directly output by said light source means, to output a corresponding first light amount signal,
   second light amount detecting means for detecting a reflected light beam reflected from the reference reflective region of said recording medium and led through said optical system, to output a corresponding second light amount signal,
   calculating means for calculating at least one of a difference and a ratio of the signals output by said first and said second light amount detecting means, to output a corresponding calculated result, and
   means for determining an abnormality of said pick-up head as a function of the calculated result of said calculating means.

2. The device according to claim 1, wherein said reference reflective region is formed of a reflective film formed concentrically with an optical disk recording medium.

3. The device according to claim 2, wherein said reflective film has a width corresponding to a predetermined number of tracks formed on said optical disk.

4. The device according to claim 3, wherein said reference reflective region is formed of a reflective film having uniform reflectivity over the entire surface.

5. The device according to claim 1, wherein said reference reflective region is formed of prepits and pregrooves provided on said optical disk.

6. The device according to claim 1, wherein said light source means is a laser diode, and said first light amount detecting means has a photosensor provided in the vicinity of said laser diode.

7. The device according to claim 1, wherein said abnormality determining means is means for generating an abnormality signal when the calculated result of said calculating means exceeds a reference value.

8. The device according to claim 1, wherein said transferring means comprises means for designating an address corresponding to said reference reflective region, means for photoelectrically detecting tracks formed on said optical disk to output a present address, and means for moving the pick-up head in response to the difference between the designated address and the present address.

9. The device according to claim 1, which further comprises tracking error signal detecting means for detecting the displacement of the light beam with respect to the track formed on said recording medium.

10. The device according to claim 1, in which said transferring means includes means for detecting the presence of the light beam at the reference reflective region in response to extinction of the tracking error signal, and means for stopping movement of said optical pick-up head upon lapse of a predetermined time from detection of said light beam at said reference reflective region by said detecting means.

* * * * *